US011081083B2

(12) United States Patent
Furihata et al.

(10) Patent No.: US 11,081,083 B2
(45) Date of Patent: Aug. 3, 2021

(54) DISPLAY REGION BASED GAMMA CURVE CONTROL

(71) Applicant: Synaptics Incorporated, San Jose, CA (US)

(72) Inventors: Hirobumi Furihata, Tokyo (JP); Tomoo Minaki, Tokyo (JP); Kazutoshi Aogaki, Tokyo (JP); Takashi Nose, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/763,978

(22) PCT Filed: Nov. 15, 2018

(86) PCT No.: PCT/US2018/061284
§ 371 (c)(1),
(2) Date: May 13, 2020

(87) PCT Pub. No.: WO2019/099674
PCT Pub. Date: May 23, 2019

(65) Prior Publication Data
US 2020/0394980 A1    Dec. 17, 2020

Related U.S. Application Data

(60) Provisional application No. 62/587,372, filed on Nov. 16, 2017.

(51) Int. Cl.
*G09G 3/36* (2006.01)
*G09G 5/10* (2006.01)
*G06F 3/041* (2006.01)

(52) U.S. Cl.
CPC ............. *G09G 5/10* (2013.01); *G06F 3/0412* (2013.01); *G09G 2310/027* (2013.01);
(Continued)

(58) Field of Classification Search
CPC ..... G09G 2310/027; G09G 2310/0297; G09G 3/3685; G09G 3/3688
See application file for complete search history.

(56) References Cited

U.S. PATENT DOCUMENTS

2007/0035498 A1* 2/2007 Jeon ..................... G09G 3/3258
345/92
2012/0056856 A1   3/2012 Woo et al.
(Continued)

FOREIGN PATENT DOCUMENTS

KR  10-2010-0108038 A  10/2010
KR  10-2014-0017881 A   2/2014

OTHER PUBLICATIONS

International Search Report issued in corresponding application No. PCT/US2018/061284, dated Mar. 13, 2019, 3 pages.
(Continued)

*Primary Examiner* — Roy P Rabindranath
(74) *Attorney, Agent, or Firm* — Ferguson Braswell Fraser Kubasta PC

(57) ABSTRACT

A display driver is disclosed. The display driver includes: a memory that stores initial control points (CPs) defining a first gamma curve for a first analog state associated with a display panel (DP); CP calculation circuitry that generates, based on the initial CPs, calculated CPs for a second analog state associated with the DP; multiplexer circuitry that: inputs the calculated CPs, auxiliary CPs defining a second gamma curve, and a switching signal identifying a luminance of a region of an image; and outputs, based on the switching signal, selected CPs; and gamma curve calculation circuitry that: inputs a data value associated with the region of the image; generates, based on the selected CPs, a portion of an output gamma curve near the data value; and outputs a voltage data for displaying the region of the image on the DP based on the data value and the output gamma curve.

22 Claims, 10 Drawing Sheets

(52) U.S. Cl.
CPC ............... *G09G 2310/0267* (2013.01); *G09G 2310/0297* (2013.01); *G09G 2310/08* (2013.01); *G09G 2320/0673* (2013.01); *G09G 2320/0686* (2013.01); *G09G 2360/16* (2013.01)

(56) References Cited

U.S. PATENT DOCUMENTS

| | | | |
|---|---|---|---|
| 2014/0022287 A1* | 1/2014 | Ahn | G09G 3/3648 345/690 |
| 2015/0187264 A1 | 7/2015 | Pyo | |
| 2016/0329019 A1 | 11/2016 | An | |
| 2018/0204522 A1* | 7/2018 | Furihata | G09G 3/3275 |

OTHER PUBLICATIONS

Written Opinion of the International Searching Authority issued in corresponding application No. PCT/US2018/061284, dated Mar. 13, 2019, 7 pages.

\* cited by examiner

DISPLAY REGION BASED GAMMA CURVE CONTROL

FIELD

The disclosed technology generally relates to a display driver for controlling a display panel.

BACKGROUND

Display devices including display panels such as a light emitting diode (LED) display, organic light emitting diode (OLED) display, cathode ray tube (CRT) display, liquid crystal display (LCD), plasma display, and electroluminescence (EL) display are widely used in a variety of electronic systems, such as cellular phones, smartphones, notebook or desktop computers, netbook computers, tablet PCs, electronic book readers, personal digital assistants (PDAs), and vehicles including cars equipped with the display panels. Display states of a display panel may be controlled by a display driver. The display driver may be integrated with a touch driver to constitute, for example, a touch and display driver integrated (TDDI) circuitry/chip to be used in a touch display that has both display and touch detection functionality.

SUMMARY

In general, in one aspect, one or more embodiments are directed towards a display driver. The display driver comprises: a memory configured to store initial control points (CPs) defining a first gamma curve for a first analog state associated with a display panel; CP calculation circuitry configured to generate, based on the initial CPs, calculated CPs for a second analog state associated with the display panel; multiplexer circuitry configured to: input the calculated CPs, auxiliary CPs defining a second gamma curve, and a switching signal identifying a luminance of a region of an image; and output, based on the switching signal, selected CPs from the calculated CPs and the auxiliary CPs; and gamma curve calculation circuitry configured to: input a data value associated with the region of the image; generate, based on the selected CPs, a portion of an output gamma curve near the data value; and output a voltage data for displaying the region of the image on the display panel based on the data value and the output gamma curve.

In general, in one aspect, one or more embodiments are directed towards a method. The method comprises: obtaining initial control points (CPs) defining a first gamma curve for a first analog state associated with a display panel; generating, based on the initial CPs, calculated CPs for a second analog state associated with the display panel; selecting, based on a switching signal identifying a luminance of a region of an image, a set of CPs from the calculated CPs and auxiliary CPs defining a second gamma curve; obtaining a data value associated with the region of the image; generating, based on the set of CPs, a portion of an output gamma curve near the data value; and outputting a voltage data for displaying the region of the image on the display panel based on the data value and the output gamma curve.

In general, in one aspect, one or more embodiments are directed towards a display device. The display device comprises: a display panel; a memory configured to store initial control points (CPs) defining a first gamma curve for a first analog state associated with the display panel; CP calculation circuitry configured to generate, based on the initial CPs, calculated CPs for a second analog state associated with the display panel; selector circuitry configured to: input the calculated CPs, auxiliary CPs defining a second gamma curve, and a switching signal identifying a luminance of a region of an image; and output, based on the switching signal, a set of CPs selected from the calculated CPs and the auxiliary CPs; and gamma curve calculation circuitry configured to: input a data value associated with the region of the image; generate, based on the set of CPs, a portion of an output gamma curve near the data value; and output a voltage data for displaying the region of the image on the display panel based on the data value and the output gamma curve.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may succeed (or precede) the second element in an ordering of elements.

One or more embodiments provide a display driver for a display panel, a display device equipped with a display driver and a display panel, and a method that facilitates improved display states of the display panel.

In one or more embodiments, when displaying an image, the display driver utilizes different gamma curves for different regions of the image. A gamma curve maps image data to voltage data, and the voltage data will be used to generate an analog voltage signal to drive the display panel. A region may be any shape or size. A region may correspond to a single pixel and thus the display driver may select gamma curves on a pixel-by-pixel basis. The gamma curves of one or more regions may remain constant over time, while the gamma curves of other regions may change with time. Additionally or alternatively, the gamma curves of different regions may change at different times and/or for different reasons.

Figure 1:
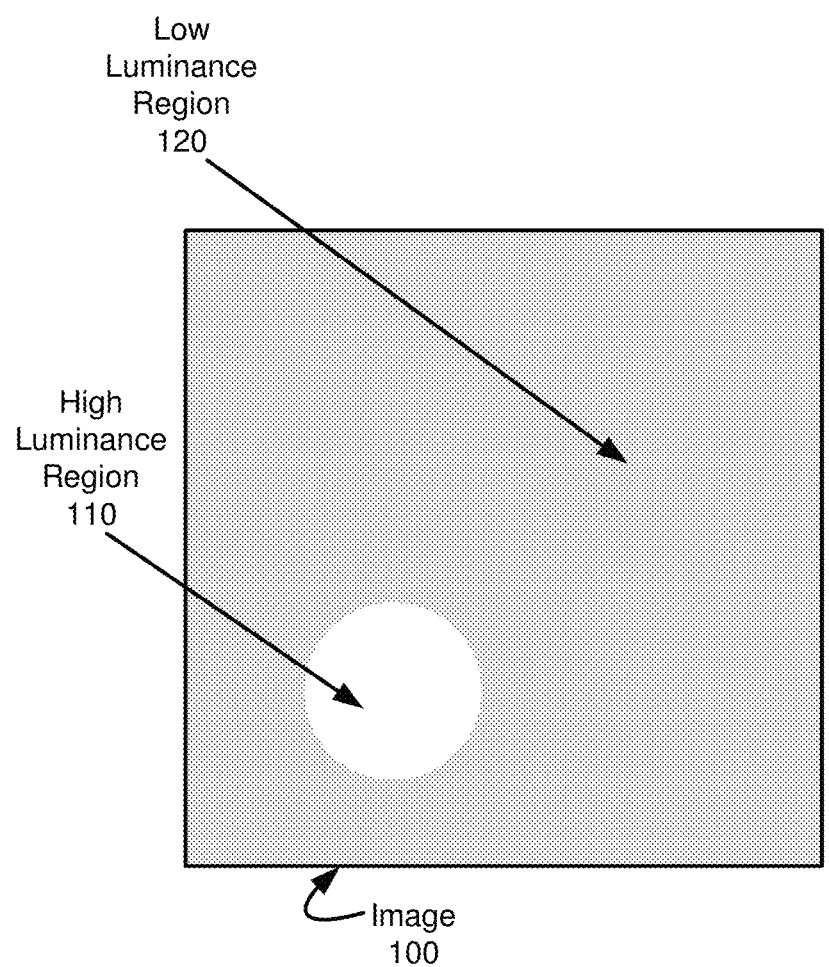
FIG. 1 shows an example image in accordance with one or more embodiments.

FIG. 1 shows an image (100) in accordance in with one or more embodiments. The image (100) may include one or more low luminance regions (e.g., low luminance region (120)) and one or more high luminance regions (e.g., high luminance region (110)). Although only two types of luminance regions are shown, in other embodiments, there are three or more types of luminance regions (e.g., low luminance region, intermediate luminance region, high luminance region, etc.). The high luminance region (110) is displayed using one gamma curve, while the low luminance region (120) is displayed using a different gamma curve.

Figure 2:
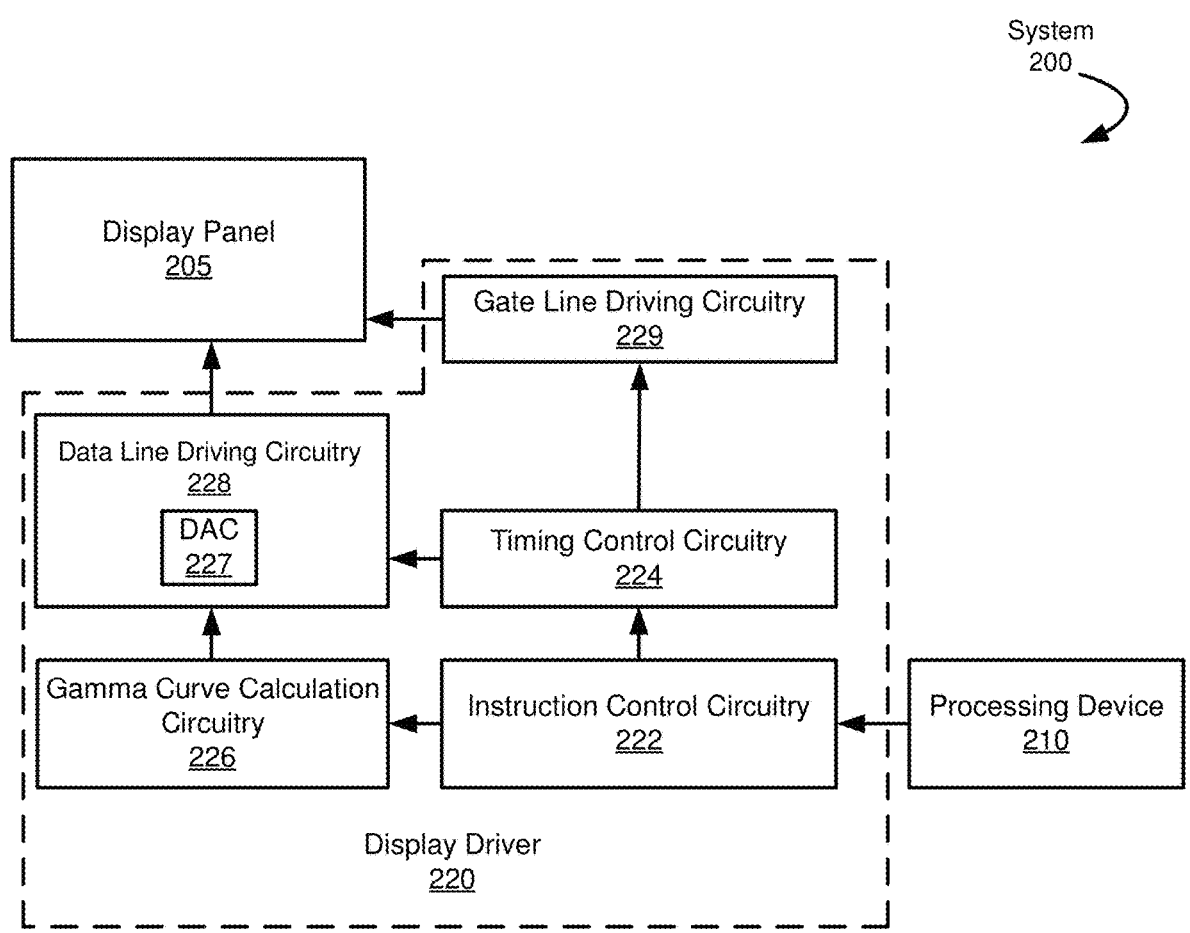
FIG. 2 shows a block diagram of a system in accordance with one or more embodiments.

FIG. 2 is a block diagram of a system (200) in accordance with one or more embodiments. The system (200) includes a display panel (205) and a display driver (220) electrically connected to the display panel (205). The display driver (220) drives the display panel (205) in response to image data and/or control instruction received from a processing device (210). The processing device (210) may include a processor such as an application processor and/or a central processing unit (CPU).

In one or more embodiments, the display panel (205) may be a liquid crystal display (LCD). Additionally or alternatively, the display panel (205) may be an organic light emitting diode (OLED). The display panel (205) may include pixels formed of switching elements, such as thin film transistors (TFTs) and n-type or p-type metal-oxide-semiconductor field-effect transistors (MOSFETs), arranged in a grid pattern. The switching elements (i.e., pixels) may be connected to gate lines and data lines so as to individually switch on/off the pixels in response to driving signals from the display driver (220).

In one or more embodiments, the display driver (220) includes instruction control circuitry (222), timing control circuitry (224), gate line driving circuitry (229), data line driving circuitry (228) including a Digital to Analog Converter (DAC) (227), and gamma curve calculation circuitry (226). Each of these components (222, 224, 226, 227, 228, 229) may be implemented in any combination of hardware and software. In one embodiment, the display driver (220) is a display driver integrated circuit (IC). In one or more embodiments, the instruction control circuitry (222) causes the timing control circuitry (224) to control the timing of driving of the gate lines of the display panel (205) by the gate line driving circuitry (229), and to control the timing of driving of the data lines of the display panel (205) by the data line driving circuitry (228).

Although not shown, the display driver (220) may be integrated with touch drivers to constitute, for example, a touch and display driver integrated (TDDI) circuitry/chip. The display panel (205) may have both display and touch detection functionality.

In one or more embodiments, the gamma curve calculation circuitry (226) generates multiple gamma curves and then outputs voltage data by applying image data for a region to the appropriate gamma curve for the region. In some embodiments, the gamma curve calculation circuitry (226) generates different gamma curves for different luminance regions of the image. In one or more embodiments, the DAC (227) may generate, based on the voltage data, an analog voltage signal to drive the display panel (205). The output of the DAC (227) may be controlled by the voltage data provided by the gamma curve calculation circuitry (226).

In one or more embodiments, the system (200) operates in different analog states (e.g., analog state A, analog state B, analog state C, etc.). At least one attribute of an analog state is the output voltage range of the DAC (227) (e.g., the DAC bottom voltage). In other words, in different analog states, different output voltage ranges of the DAC (227) may be utilized to drive the display panel (205). A larger output voltage range may be necessary to achieve high luminance in the high luminance region(s) of an image.

In one or more embodiments, one attribute of an analog state is the duty ratio of emission pulses ("emission"). In other words, in different analog states, different emissions may be specified. The emission controls the ratio of the light emitting period per frame period, where the light emitting period is a period during which light emitting elements in the display panel (205) are allowed to emitted light. When the emission is 100%, the display luminance level increases to the maximum because the light emitting elements emit light for the maximum allowed time during each frame period. Accordingly, the emission is one parameter controlling the overall luminance of an image displayed on the display panel (205).

Figure 3:
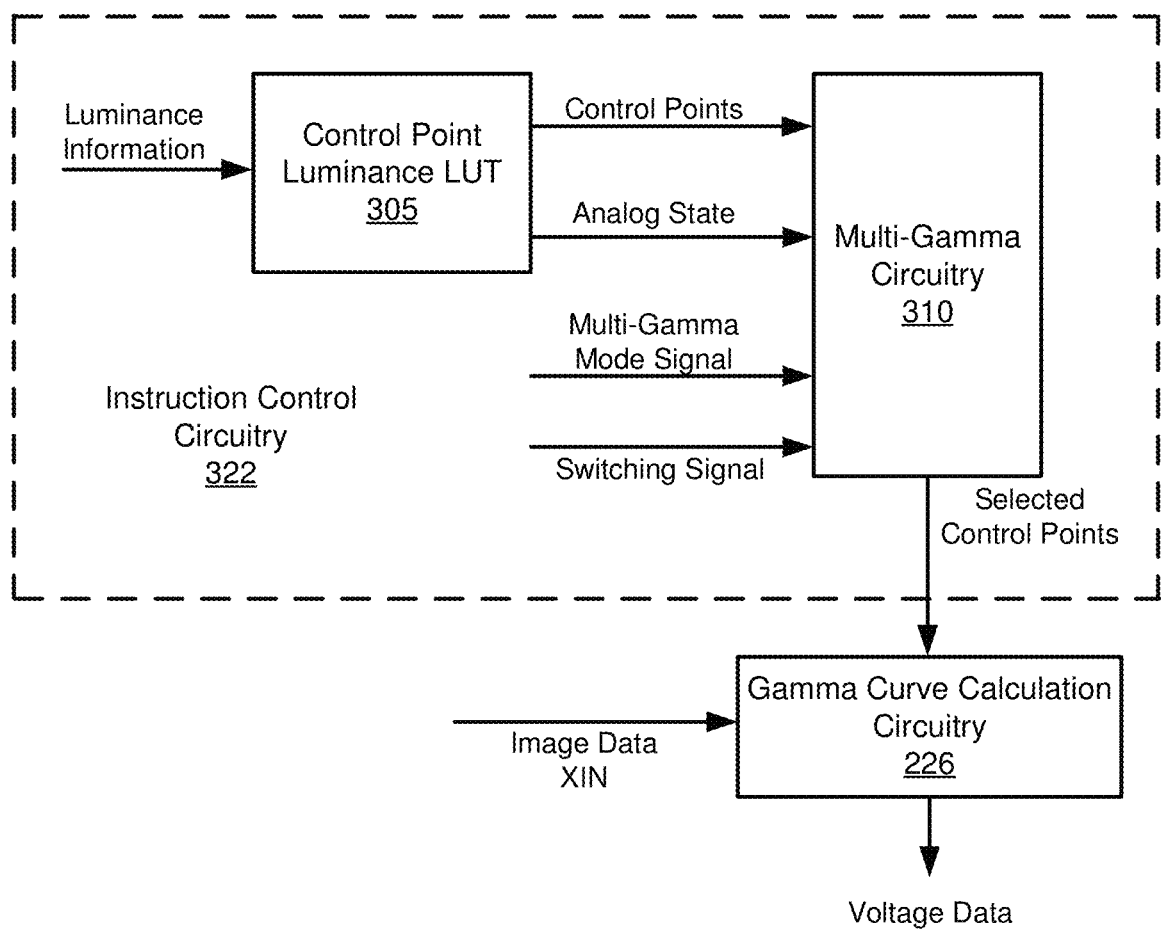
FIG. 3 shows a block diagram of instruction control circuitry in accordance with one or more embodiments.

FIG. 3 shows a block diagram of instruction control circuitry (322) in accordance with one or more embodiments. The instruction control circuitry (322) may correspond to instruction control circuitry (222), discussed above in reference to FIG. 2. As shown in FIG. 3, the instruction control circuitry (322) has multiple components including a control point luminance look-up table (LUT) (305) and multi-gamma circuitry (310). Each of these components (305, 310) may correspond to any combination of hardware and software.

In one or more embodiments, as shown in FIG. 3, the multi-gamma circuitry (310) outputs a number (e.g., 3, 8, 11, etc.) of control points defining a gamma curve to the gamma curve calculation circuitry (226). For example, different sets of control points define different gamma curves. The gamma curve calculation circuitry (226) may utilize the control points to generate all or part of a gamma curve, and the gamma curve may then be used to output voltage data based on the input image data (e.g., XIN). In one or more embodiments, the gamma curve circuitry (226) calculates the gamma curves using a binary search and Bezier calculation method.

Figure 4:
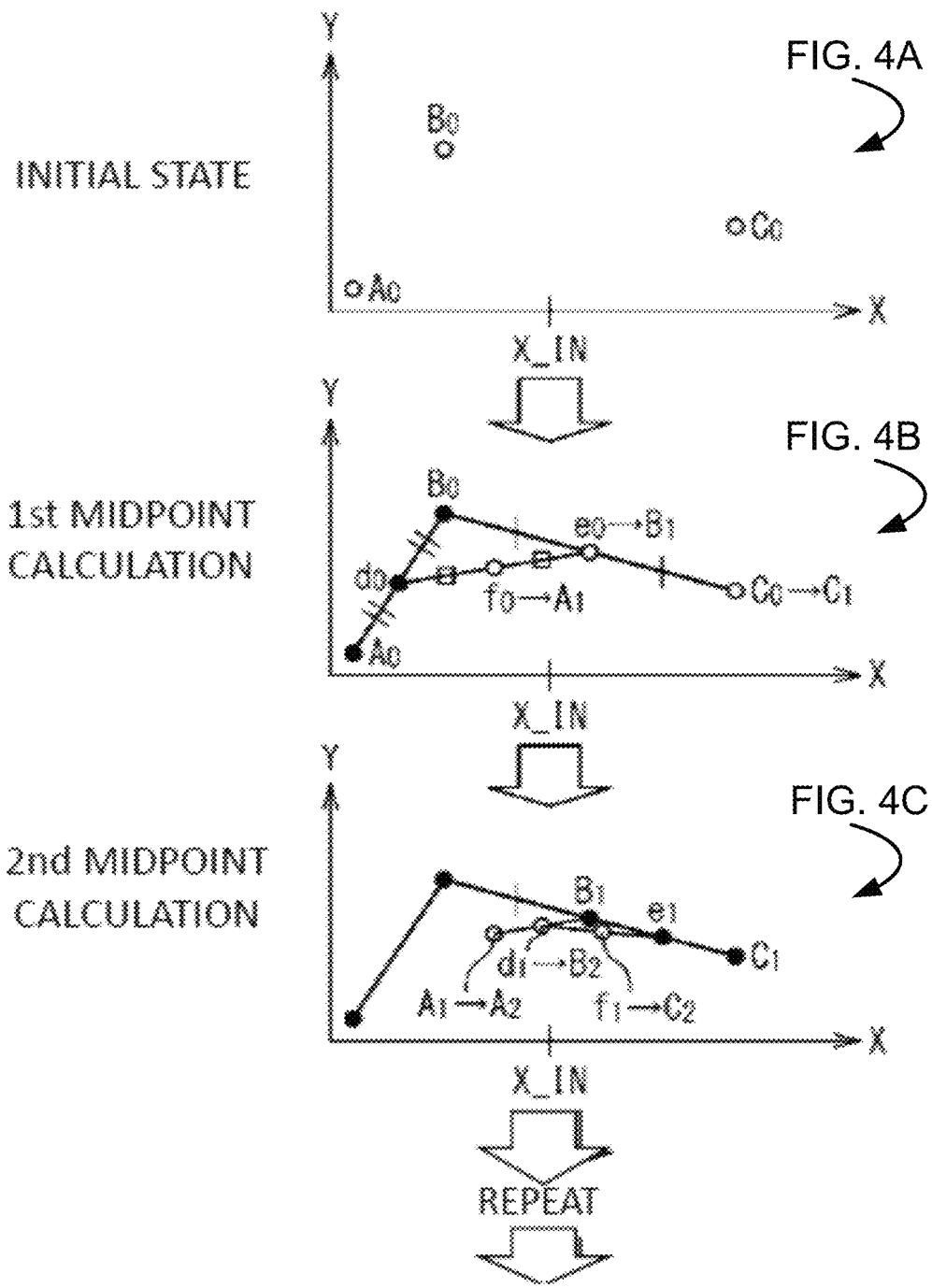
FIGS. 4A-4C show an example of gamma curve generation in accordance with one or more embodiments.

FIG. 4A, FIG. 4B, and FIG. 4C show an example of gamma curve generation in accordance with one or more embodiments. Specifically, this is an example of the binary search and Bezier calculation method. In this example, the gamma curve calculation circuitry (226) selects three control points ($A_0$, $B_0$, $C_0$) from among the CPs received from the multi-gamma circuitry (310). In one or more embodiment, the selection of the CPs is based on the grayscale value described in the image data and the X coordinates of the CPs. In one or more embodiments, the gamma curve calculation circuitry (226) selects three CPs having X coordinates closest to the grayscale value described in the input image data. $AX_0$ and $AY_0$ are the X-coordinate and Y-coordinate, respectively, of control point $A_0$. Further, $BX_0$ and $BY_0$ are the X-coordinate and Y-coordinate, respectively, of control point $B_0$. Furthers still, $CX_0$ and $CY_0$ are the X-coordinate and Y-coordinate, respectively, of control point $C_0$ (FIG. 4A).

In one or more embodiments, the output voltage data is calculated by repeating a calculation for obtaining a midpoint as described below. One unit of the iterative calculation will be referred to as a midpoint calculation below. A midpoint between two adjacent control points among the three control points may be referred to as a primary midpoint, and a midpoint between the two primary midpoints may be referred to as a secondary midpoint.

In the first midpoint calculation (FIG. 4B), primary midpoint $d_0$ between $A_0$ and $B_0$, and primary midpoint $e_0$ between $B_0$ and $C_0$ are obtained, and further secondary midpoint $f_0$ between $d_0$ and $e_0$ is obtained. Secondary midpoint $f_0$ located on a desired gamma curve (i.e., a secondary Bezier curve defined by the three control points $A_0$, $B_0$, and $C_0$). At this moment, the coordinates of secondary midpoint $f_0$ is expressed by the following formulas.

$$X_{f0}=(AX_0+2BX_0+CX_0)/4$$

$$Y_{f0}=(AY_0+2BY_0+CY_0)/4$$

Three control points $A_1$, $B_1$, and $C_1$ to be used in the next midpoint calculation (second midpoint calculation) are selected from among point $A_0$, primary midpoint $d_0$, secondary midpoint $f_0$, primary midpoint $e_0$, and point $B_0$, depending upon a comparison result between input data XIN and the X coordinate value $X_{f0}$ of secondary midpoint $f_0$. For example, $A_1$, $B_1$, and $C_1$ are selected as described below.

(A) In the case of $X_{f0} \geq X\_IN$, three points having smaller X coordinate values (three points on the left side), i.e., point $A_0$, primary midpoint $d_0$, and secondary midpoint $f_0$ are selected as $A_1$, $B_1$, and $C_1$ (i.e., $A_1=A_0$, $B_1=d_0$, $C_1=f_0$).

(B) In the case of $X_{f0} \leq X\_IN$, three points having larger X coordinate values (three points on the right side), i.e., secondary midpoint $f_0$, primary midpoint $e_0$, and point $C_0$ are selected as $A_1$, $B_1$, and $C_1$. (i.e., $A_1=f_0$, $B_1=e_0$, $C_1=C_0$)

The second midpoint calculation (FIG. 4C) is performed by the same procedure. For points $A_1$, $B_1$, and $C_1$, primary midpoint $d_1$ between $A_1$ and $B_1$, and primary midpoint $e_1$ between $B_1$ and $C_1$ are obtained. Then, secondary midpoint $f_1$ between primary midpoint $d_1$ and primary midpoint $e_1$ is obtained. Secondary midpoint $f_1$ is located on the desired gamma curve. After that, three control points $A_2$, $B_2$, and $C_2$ are selected for use in the next midpoint calculation (third midpoint calculation) from among point $A_1$, primary midpoint $d_1$, secondary midpoint $f_1$, primary midpoint $e_1$, and point $B_1$, depending upon the comparison result between the input data (X_IN) and X coordinate value $X_{f1}$ of secondary midpoint $f_1$.

Thereafter, the midpoint calculation is repeated for a predetermined number of times by the same procedure. In the i-th midpoint calculation, the following calculations are performed.

in the case of $(AX_{i-1}+2BX_{i-1}+CX_{i-1})/4 \geq X\_IN$, (A)

$$AX_i=AX_{i-1},\qquad(2a)$$

$$BX_i=(AX_{i-1}+BX_{i-1})/2,\qquad(3a)$$

$$CX_i=(AX_{i-1}+2BX_{i-1}+CX_{i-1})/4,\qquad(4a)$$

$$AY_i=AY_{i-1}\qquad(5a)$$

$$BY_i=(AY_{i-1}+BY_{i-1})/2,\qquad(6a)$$

$$CY_i=(AY_{i-1}+2BY_{i-1}+CY_{i-1})/4\qquad(7a)$$

In the case of $(AX_{i-1}+2BX_{i-1}+CX_{i-1})/4 < X\_IN$, (B)

$$AX_i=(AX_{i-1}+2BX_{i-1}+CX_{i-1})/4,\qquad(2b)$$

$$BX_i=(BX_{i-1}+CX_{i-1})/2,\qquad(3b)$$

$$CX_i=CX_{i-1},\qquad(4b)$$

$$AY_i=(AY_{i-1}+2BY_{i-1}+CY_{i-1})/4,\qquad(5b)$$

$$BY_i=(BY_{i-1}+CY_{i-1})/2,\qquad(6b)$$

$$CY_i=CY_{i-1}.\qquad(7b)$$

In the above, condition (A) is shown as being satisfied if the expression is greater than or equal to X_IN (i.e., $\geq$X_IN). In one or more embodiments, condition (A) is only satisfied if the expression exceeds X_IN (i.e., >X_IN), while the requirement in condition (B) is satisfied if the expression is less than or equal to X_IN (i.e., $\leq$X_IN).

Every time the midpoint calculation is performed, control points $A_1$, $B_1$, and $C_1$ approach the gamma curve, and the X coordinate values of control points $A_i$, $B_i$, and $C_i$ approach the input data. The output voltage data that should be finally calculated can be obtained from at least one of the Y coordinate values of $A_N$, $B_N$, and $C_N$ that have been obtained by the Nth midpoint calculation. For example, the Y coordinate value of one point arbitrarily selected from among points $A_N$, $B_N$, and $C_N$ may be selected as the output voltage data. Alternatively, an average value of the Y coordinate values of $A_N$, $B_N$, and $C_N$ may be selected as the output voltage data.

The number (N) times of the midpoint calculations may be equal to or larger than the number of bits of the input data. In one or more embodiments, when the input data is N-bit data, the midpoint calculations are performed for N or more times. In this case, after the Nth midpoint calculation, the difference between the X coordinates of points $A_N$ and $C_N$ becomes one, and any one of the X coordinates of points $A_N$ and $C_N$ matches with the input data. At that time, the X coordinate of point $B_N$ also matches with one of the X coordinates of points $A_N$ and $C_N$. Therefore, the output voltage data (Y_OUT) is selected as follows in one or more embodiments.

in the case of $X\_IN=AX_N$, (a)

$Y\_OUT=AY_N$.

in the case of $X\_IN=CX_N$, (b)

$Y\_OUT=CY_N$.

Referring back to FIG. 3, in one or more embodiments the control point-luminance LUT (305) stores information for luminance control, such as gamma shapes, top voltages of digital gamma, top voltages of analog gamma, emission pulses, and voltages of power supply (VDD), with respect to certain luminance levels. In one or more embodiments, the control point-luminance LUT (305) stores a plurality of sets of control points, each set defining a gamma curve, top and bottom voltages of the output voltage range of the DAC (227), and "emissions" (or allowed duty ratios of the emission pulses). The control point-luminance LUT (305) may output a set of control points of a desired gamma curve to the multi-gamma circuitry (310) upon reception of the luminance information (e.g., from the processing device (210) of an image).

In one or more embodiments, the control point-luminance LUT (305) also outputs the analog setting with respect to the received luminance information to the multi-gamma circuitry (310). In one or more embodiments, the analog setting includes the top and bottom voltages of the output voltage range of the DAC (227)) and the emission.

In one or more embodiments, the multi-gamma circuitry (310) inputs a multi-gamma mode signal. When enabled, the multi-gamma mode signal indicates to the multi-gamma circuitry (310) that different regions of the image will be displayed using different gamma curves and that at least one gamma curve (e.g., the gamma curve corresponding to low luminance regions of the image) may need to be adjusted to maintain the desired luminance of the low luminance image regions despite a change in analog states. The multi-gamma mode signal may also trigger the multi-gamma circuitry (310) to store initial control points and calculate control points for the gamma curves associated with the one or more luminance regions (discussed below).

In one or more embodiments, the multi-gamma circuitry (310) inputs a switching signal. The switching signal may identify the luminance of the region associated with the image data XIN (e.g., the luminance of the region associated with the image data currently being supplied to the gamma curve calculation circuitry (226)). A high value of the switching signal may indicate that the image region is a high luminance region. A low value of the switching signal may indicate that the image region is a low luminance region. In one or more embodiments, the control points that are selected and output by the multi-gamma circuitry (and thus the gamma curve that is generated by gamma curve calculation circuitry (226)) depend on whether the image region is identified as high luminance or low luminance.

Figure 5:
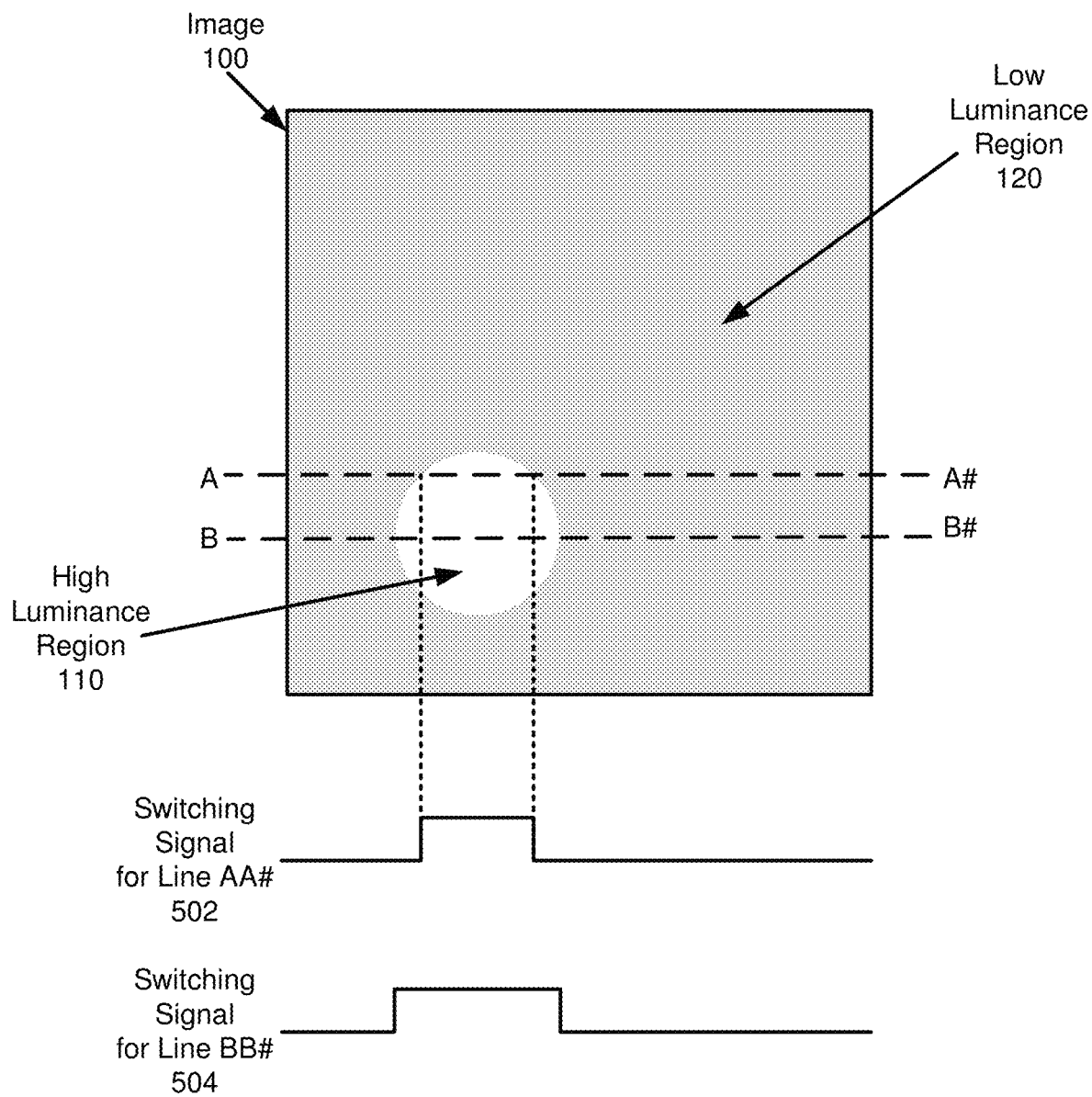
FIG. 5 shows switching signals in accordance with one or more embodiments.

FIG. 5 shows examples of switching signals that are supplied to the multi-gamma circuitry (310) in accordance with one or more embodiments. FIG. 5 includes a replica of image (100) from FIG. 1. Moreover, FIG. 5 shows a switching signal for the line AA # (502) and a switching signal for the line BB # (504). For the portion(s) of the line AA # that cross the high luminance region(s) (110), the switching signal for line AA # (502) goes high. Similarly, for the portion(s) of the line AA # that cross the low luminance region(s) (120), the switching signal for line AA # (502) goes low. For the portion(s) of the line BB # that cross the high luminance region(s) (110), the switching signal for line BB # (504) goes high. Similarly, for the portion(s) of the line BB # that cross the low luminance region(s) (120), the switching signal for line BB # (504) goes low.

Figure 6:
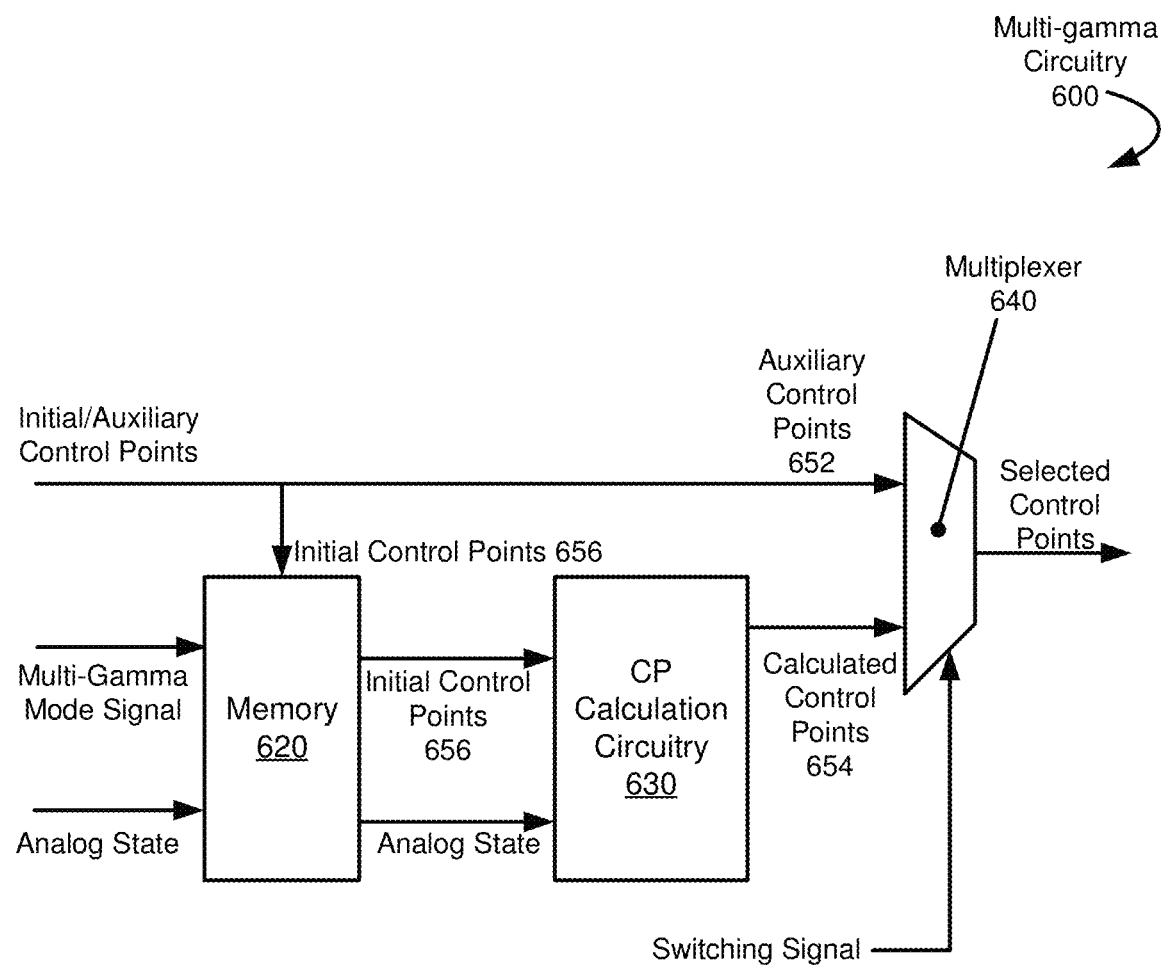
FIG. 6 shows multi-gamma circuitry in accordance with one or more embodiments.

FIG. 6 show a block diagram of the multi-gamma circuitry (600) in accordance with one or more embodiments. The multi-gamma circuitry (600) may correspond to multi-gamma circuitry (310), discussed above in reference to FIG. 3. As shown in FIG. 6, the multi-gamma circuitry includes a memory (620), control point (CP) calculation circuitry (630), and a multiplexer (640). Each of these components (620, 630, 640) may be implemented in any combination of hardware and software.

In one or more embodiments, the multiplexer (640) selects between auxiliary control points (652) and calculated control points (654) based on the switching signal. In some embodiments, if the switching signal is low, indicating an image region of low luminance, the multiplexer (640) selects the calculated control points (654) for output. If the switching signal is high, indicating an image region of high luminance, the multiplexer (640) selects the auxiliary control points (652) for output. The auxiliary control points (652) may be supplied by the control point luminance LUT (305), discussed above in reference to FIG. 3. The calculated control points (654) may be supplied by the CP calculation circuitry (630). In one or more embodiments, the selected control points (i.e., calculated control points or auxiliary control points) are output to the gamma curve calculation circuitry (226), which utilizes the selected control points to generate a gamma curve.

In one or more embodiments, the memory (620) stores a set of initial control points (656). The initial control points (656) may be supplied by the control point luminance LUT (305), discussed above in reference to FIG. 3. In some embodiments, when the multi-gamma mode signal goes high, this triggers the memory (620) to store the initial control points (656). The memory (620) may replace any existing control points already stored into the memory (620) with the initial control points. The memory may be implemented as a set of flipflops (e.g., 13 flipflops).

In one or more embodiments, the CP calculation circuitry (630) generates the calculated control points (654) from the initial control points (656). In one or more embodiments, the CP calculation circuitry (630) generates the calculated control points (654) by modifying the initial control points (656). The calculated control points (654) may be the result of the CP calculation circuitry (630) performing two kinds of calculations on the initial control points (656): (i) voltage calculations; and (ii) luminance calculations (both types are discussed below). If the display panel (205) is a light emission display panel (e.g., OLED), then both voltage calculations and luminance calculations are performed. If the display panel (205) is equipped by a backlight (e.g., LCD), only the luminance calculations need to be performed.

Voltage Calculations

In one or more embodiments, the initial control points (654) define an initial gamma curve for a low luminance image region when the display driver (220) is operating in one of the analog states (e.g., analog state A). As discussed above, the output voltage range of the DAC may be one attribute of analog state A.

In one or more embodiments, if the display driver (220) begins operating in a different analog state (e.g., analog state B) with a different output voltage range for the DAC, it may be necessary to adjust the initial gamma curve for the low luminance region to maintain the desired luminance of the low luminance region (e.g., to ensure the same image data results in the same voltage output from the DAC). In one or more embodiments, the initial gamma curve is adjusted by adjusting the y-coordinates of the initial control points (discussed below).

Figure 7A:
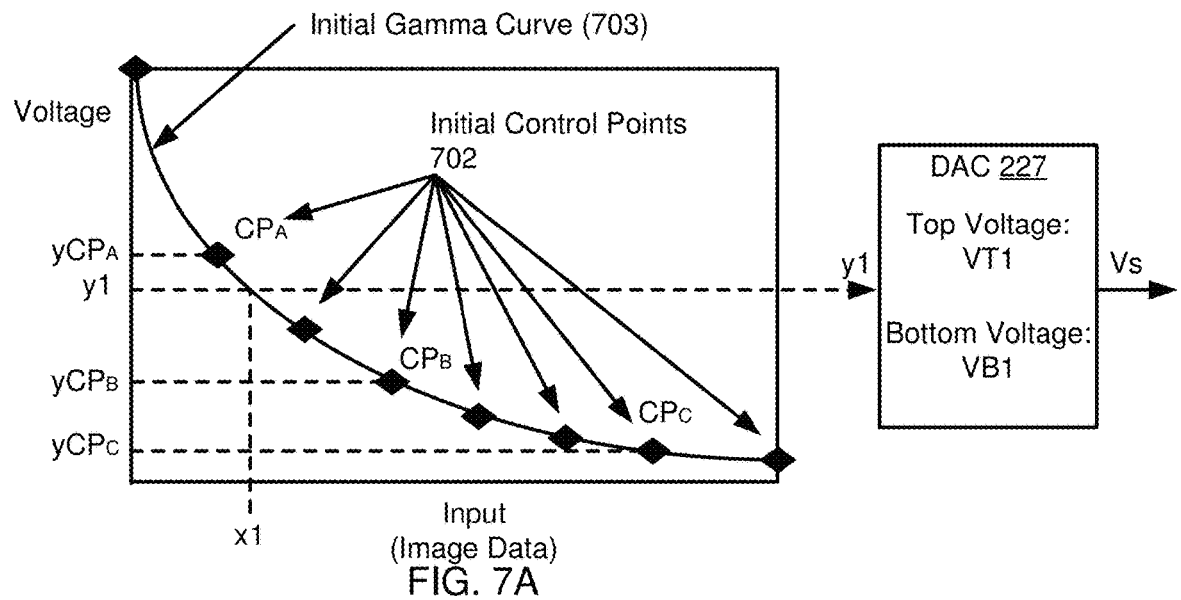
FIG. 7A and FIG. 7B show gamma curves in accordance with one or more embodiments.

FIG. 7A shows an initial gamma curve (703) in accordance with one or more embodiments, wherein the initial gamma curve (703) maps input image data to voltage data and the initial gamma curve (703) is defined by initial control points (702). In analog state A, the output of the DAC (227) ranges from DAC Top Voltage VT1 to DAC Bottom Voltage VB1. $CP_A$, $CP_B$, and $CP_C$ are three of the initial control points (702). $yCP_A$, $yCP_B$, and $yCP_C$ are the y-coordinates of $CP_A$, $CP_B$, and $CP_C$, respectively. The initial gamma curve (703) maps image data x1 to voltage data y1. In analog state A, the DAC (227) outputs analog voltage signal Vs between VT1 and VB1 in response to an input of voltage data y1.

Figure 7B:
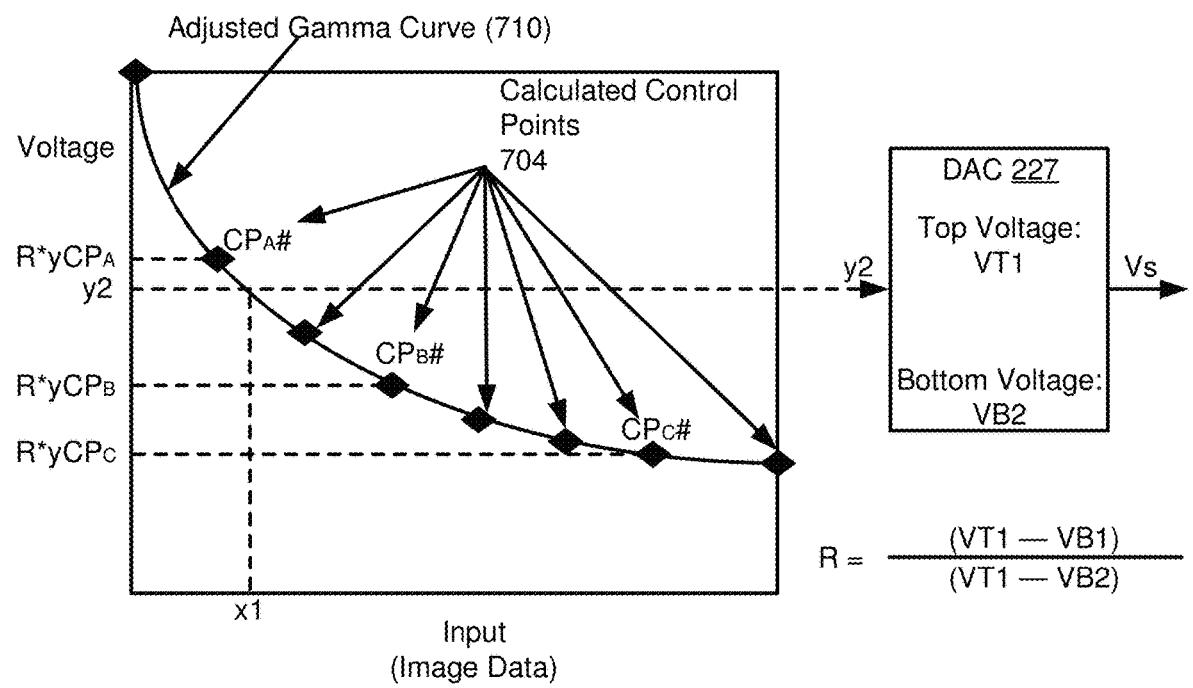

In FIG. 7B, the display driver (220) is now operating in analog state B. In analog state B, the DAC output ranges from DAC Top Voltage VT1 to DAC New Bottom Voltage VB2 in accordance with one or more embodiments. An adjusted gamma curve (710) is defined by calculated control points (704). The calculated control points (704) and the initial control points (702) have the same x-coordinates, but different y-coordinates. The y-coordinate of each calculated control point (e.g., $CP_A$ #, $CP_B$ #, $CP_C$ #) (704) may be determined by scaling the y-coordinate of the corresponding initial control point by a ratio R. The ratio R may be defined as (DAC Top Voltage—DAC Bottom Voltage)/(DAC Top Voltage—DAC New Bottom Voltage). As shown in FIG. 7B, the adjusted gamma curve (710) maps the same image data x1 to different voltage data y2 (i.e., y1≠y2). In some embodiments, the DAC (227) still outputs the same analog voltage signal Vs for image data x1. Accordingly, the desired luminance for the low luminance images regions may be maintained even though there is a change in the DAC output voltage range.

Luminance Calculations

As discussed above, in one or more embodiments, the initial control points (654) define an initial gamma curve for a low luminance image region when the display driver (220) is operating in one of the analog states (e.g., analog state A). As discussed above, analog state A may specify an emission and the emission is one parameter controlling the overall luminance of an image displayed on the display panel (205).

In one or more embodiments, if the display driver (220) begins operating in a different analog state (e.g., analog state B) with a different emission, it may be necessary to adjust the initial gamma curve to cancel or compensate for the change in the emission and maintain the desired luminance for the low luminance image region (i.e., maintain the luminance for the low luminance region that existed before the emission changed). This may include adjusting the initial gamma curve by adjusting the x-coordinates of the initial control points (discussed below). This adjustment may be performed independently of any changes to the output range of the DAC.

Figure 9:
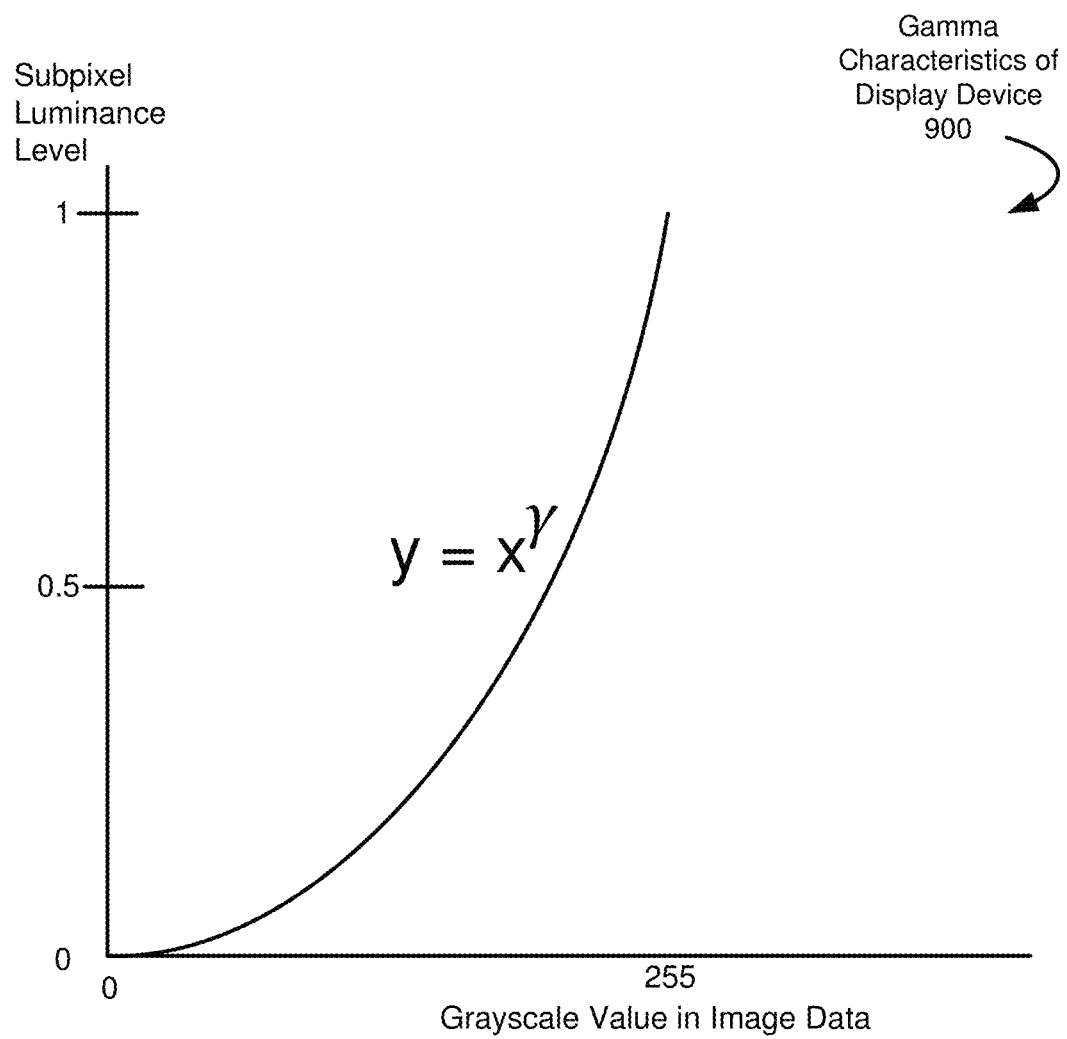
FIG. 9 shows gamma characteristics of a display device in accordance with one or more embodiments.

FIG. 9 shows a gamma characteristic (900) of a display panel. The gamma characteristic of the display panel is the relationship between the subpixel luminance level (vertical axis) and the grayscale value for an image data (horizontal axis). For an OLED display panel, the subpixel luminance corresponds to the luminance light emitted from the light emitted element. For an LCD panel, the subpixel luminance level corresponds to the transparency of the subpixel.

In one or more embodiments, the gamma characteristic (900) may be expressed as $y=x^\gamma$, where γ is the gamma value (e.g., γ=2.2). In one or more embodiments, when there is a change in emission, compensation for or canceling the change in emission to maintain the desired luminance for the low luminance image region(s) may be accomplished by multiplying the x-coordinates of the initial control points (656) by $A=p^{(1/\gamma)}$, where p=(new emission)/(original emission). The new emission is the emission of analog state B, while the original emission is the emission of analog state A when the initial control points (656) were saved and/or when the multi-gamma mode signal was enabled. When A>1, the initial gamma curve is enlarged in the horizontal direction to maintain the luminance of the low luminance image region. When A<1, the initial gamma curve is reduced in the horizontal direction to maintain the luminance of the low luminance image region. The enlargement or reduction of the initial gamma curve compensates for the change in emission.

Figure 8:
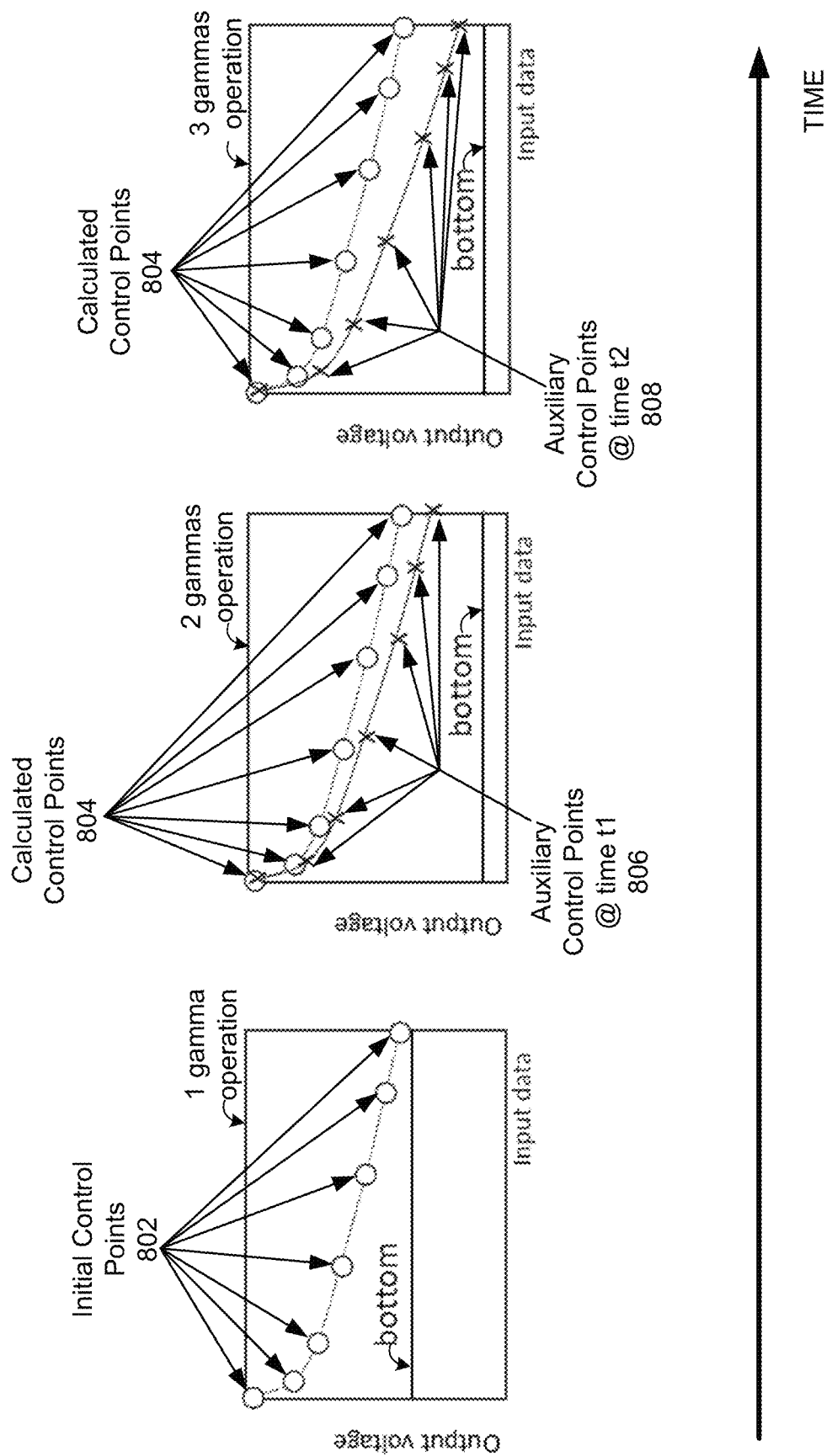
FIG. 8 shows a dimming operation in accordance with one or more embodiments.

FIG. 8 shows a dimming operation for an image using multiple gamma curves in accordance with one or more embodiments. Initial control points (802) may define an initial gamma curve for a low luminance image region. Calculated control points (804) may be generated from initial control points (802) and define an adjusted gamma curve (similar to FIG. 7A and FIG. 7B) for the low luminance image region. In some embodiments, the calculated control points (804) do not change over time. The calculated control points (804) may correspond to calculated control points (654), discussed above in referenced to FIG. 6.

FIG. 8 also shows a first set of auxiliary control points (806) at time t1 and a second set of auxiliary control points (808) at time t2 in accordance with one or more embodiments. In some embodiments, the auxiliary control points are changing with time and the calculated control points (804) are not changing. Each set of auxiliary control points defines a gamma curve for high luminance regions of an image. For example, at different times, there may be different gamma curves for high luminance image regions. Through selection of the auxiliary control points at different times, the high luminance image region will dim while the low luminance regions remain constant.

Figure 10:
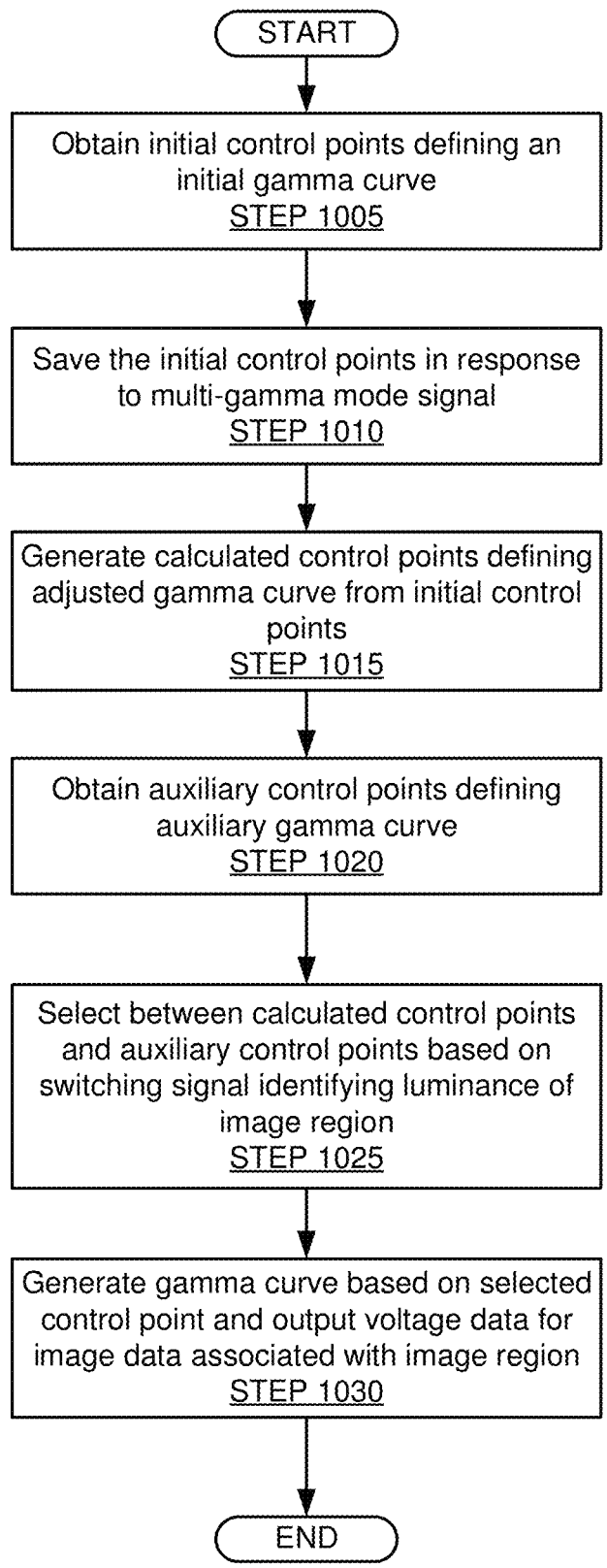
FIG. 10 shows a flowchart in accordance with one or more embodiments.

FIG. 10 shows a flowchart in accordance with one or more embodiments. The flowchart of FIG. 10 depicts a method for operating a display driver in accordance with one or more embodiments. One or more of the steps in FIG. 10 may be performed by the components of the display driver (220), discussed above in reference to FIGS. 3 and 6. In one or more embodiments, one or more of the steps shown in FIG. 10 may be omitted, repeated, and/or performed in a different order than the order shown in FIG. 10. Some steps may be performed in parallel. Accordingly, the scope of the invention should not be considered limited to the specific arrangement of steps shown in FIG. 10.

In STEP 1005, initial control points are obtained. The initial control points may define an initial gamma curve for low luminance image region(s) when the display driver is operating in one of the analog states (e.g., analog state A). Both the voltage output range of the DAC and the emission may be attributes of analog state A. The initial gamma curve achieves the desired luminance for the low luminance region(s) of the image in view of the voltage output range of the DAC and the emission of analog state A. The initial gamma curve maps image data to voltage data. The DAC may then output an analog voltage signal (to drive the display panel) based on the voltage data.

In STEP 1010, the initial control points are saved. The initial control points may be saved in response to a multi-gamma mode signal being enabled. The multi-gamma mode signal may be enabled just before the system (200) begins to operate in a different analog state (e.g., analog state B) having a different DAC output voltage range and/or a different emission than analog state A. The attributes of the current analog state may also be saved.

In STEP 1015, calculated control points are generated from the initial control points. The calculated control points define an adjusted gamma curve that maintains the desired luminance for the low luminance image regions despite the changes to the DAC output voltage range and/or the changes to the emission (i.e., despite the change in analog states). For changes in the DAC output voltage range, the y-coordinates of the calculated control points may be obtained by scaling the y-coordinates of the initial control points based on a ratio (discussed above). For changes in the emission, the x-coordinates of the calculated control points may be obtained by scaling the x-coordinates of the initial control points based on a gamma value (discussed above).

In STEP 1020, auxiliary control points are obtained. The auxiliary control points define an auxiliary gamma curve for use in displaying high luminance image regions. The auxiliary control points may change over time, resulting in a changing gamma curve for the high luminance image regions. STEP 1020 may be executed in parallel with one or more of the previous steps.

In STEP 1025, the calculated control points or the auxiliary control points are selected. The selection is based on a switching signal identifying the luminance of an image region currently being drawn (or about to be drawn) on the display panel. If the switching signal indicates the image region has a high luminance, the auxiliary control points are selected. If the switching signal indicates the image region has a low luminance, the calculated control points are selected.

In STEP 1030, a gamma curve is generated based on the selected control points. The gamma curve may be generated using a binary search and Bezier calculation method. As discussed above, the control points are selected depending on whether the image region is of high luminance or of low luminance. Accordingly, different gamma curves are used for image regions of different luminance. This enables a constant gamma curve to be used for image regions having low luminance while using different gamma curves, including gamma curves that vary with time (e.g., to implement dimming features), for the image regions having high luminance.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A display driver, comprising:
   a memory configured to store initial control points (CPs) defining a first gamma curve for a first analog state associated with a display panel;
   CP calculation circuitry configured to generate, based on the initial CPs, calculated CPs for a second analog state associated with the display panel;
   multiplexer circuitry configured to:
      input the calculated CPs, auxiliary CPs defining a second gamma curve, and a switching signal identifying a luminance of a region of an image; and
      output, based on the switching signal, selected CPs from the calculated CPs and the auxiliary CPs; and
   gamma curve calculation circuitry configured to:
      input a data value associated with the region of the image;
      generate, based on the selected CPs, a portion of an output gamma curve near the data value; and
      output a voltage data for displaying the region of the image on the display panel based on the data value and the portion of the output gamma curve.

2. The display driver of claim 1, wherein the region comprises a pixel of the image.

3. The display driver of claim 1, wherein the selected CPs are the calculated CPs in response to the switching signal identifying the region of the image as being low luminance.

4. The display driver of claim 1, wherein the selected CPs are the auxiliary CPs in response to the switching signal identifying the region of the image as being high luminance.

5. The display driver of claim 1, further comprising:
   a digital to analog converter (DAC) configured to output an analog voltage signal to the display panel based on the voltage data,
   wherein the DAC is configured to operate with a first output voltage range during the first analog state and operate with a second output voltage range during the second analog state.

6. The display driver of claim 5, wherein the CP calculation circuitry is further configured to generate the calculated CPs by modifying the initial CPs based on the first output voltage range and the second output voltage range.

7. The display driver of claim 6, wherein the CP calculation circuitry is further configured to generate the calculated CPs by modifying the initial CPs based on a first bottom voltage of the first output voltage range and a second bottom voltage of the second output voltage range.

8. The display driver of claim 7, wherein the CP calculation circuitry is further configured to generate the calculated CPs by modifying the initial CPs based on a first top voltage of the first output voltage range and a second top voltage of the second output voltage range.

9. The display driver of claim 1, wherein:
   the first analog state comprises a first ratio of a light emitting period per frame period;
   the display panel comprises light emitting elements allowed to emit light during the light emitting period;
   the second analog state comprises a second ratio of the light emitting period per frame period; and
   the CP calculation circuitry is further configured to generate the calculated CPs by modifying the initial CPs based on the first ratio and the second ratio.

10. The display driver of claim 1, wherein the gamma curve calculation circuitry is further configured to calculate the portion of the output gamma curve using a binary search and Bezier calculation method.

11. A method, comprising:
    obtaining initial control points (CPs) defining a first gamma curve for a first analog state associated with a display panel;
    generating, based on the initial CPs, calculated CPs for a second analog state associated with the display panel;
    selecting, based on a switching signal identifying a luminance of a region of an image, a set of CPs from the calculated CPs and auxiliary CPs defining a second gamma curve;
    obtaining a data value associated with the region of the image;
    generating, based on the set of CPs, a portion of an output gamma curve near the data value; and
    outputting a voltage data for displaying the region of the image on the display panel based on the data value and the portion of the output gamma curve.

12. The method of claim 11, wherein the set of CPs is the calculated CPs in response to the switching signal identifying the region of the image as being low luminance.

13. The method of claim 11, wherein generating the calculated CPs comprises:
    modifying the initial CPs based on a first output voltage range of a digital to analog converter (DAC) and a second output voltage range of the DAC,
    wherein the DAC is configured to operate with the first output voltage range in the first analog state, and wherein the DAC is configured to operate with the second output voltage range in the second analog state.

14. The method of claim 13, wherein generating the calculated CPs further comprises:
modifying the initial CPs based on a first bottom voltage of the first output voltage range and a second bottom voltage of the second output voltage range.

15. The method of claim 11, wherein:
the first analog state comprises a first ratio of a light emitting period per frame period;
the display panel comprises light emitting elements allowed to emit light during the light emitting period;
the second analog state comprises a second ratio of the light emitting period per frame period; and
the CP calculation circuitry is further configured to generate the calculated CPs by modifying the initial CPs based on the first ratio and the second ratio.

16. The method of claim 11, wherein calculating the portion of the output gamma curve comprises a binary search and Bezier calculation method.

17. A display device, comprising:
a display panel;
a memory configured to store initial control points (CPs) defining a first gamma curve for a first analog state associated with the display panel;
CP calculation circuitry configured to generate, based on the initial CPs, calculated CPs for a second analog state associated with the display panel;
selector circuitry configured to:
input the calculated CPs, auxiliary CPs defining a second gamma curve, and a switching signal identifying a luminance of a region of an image; and
output, based on the switching signal, a set of CPs selected from the calculated CPs and the auxiliary CPs; and
gamma curve calculation circuitry configured to:
input a data value associated with the region of the image;
generate, based on the set of CPs, a portion of an output gamma curve near the data value; and
output a voltage data for displaying the region of the image on the display panel based on the data value and the portion of the output gamma curve.

18. The display device of claim 17, wherein the set of CPs is the calculated CPs in response to the switching signal identifying the region of the image as being low luminance.

19. The display device of claim 17, wherein the CP calculation circuitry is further configured to generate the calculated CPs by:
modifying the initial CPs based on a first output voltage range of a digital to analog converter (DAC) and a second output voltage range of the DAC,
wherein the DAC is configured to operate with the first output voltage range in the first analog state, and
wherein the DAC is configured to operate with the second output voltage range in the second analog state.

20. The display device of claim 19, wherein the CP calculation circuitry is further configured to generate the calculated CPs by modifying the initial CPs based on a first bottom voltage of the first output voltage range and a second bottom voltage of the second output voltage range.

21. The display device of claim 17, wherein:
the first analog state comprises a first ratio of a light emitting period per frame period;
the display panel comprises light emitting elements allowed to emit light during the light emitting period;
the second analog state comprises a second ratio of the light emitting period per frame period; and
the CP calculation circuitry is further configured to generate the calculated CPs by modifying the initial CPs based on the first ratio and the second ratio.

22. The display device of claim 17, wherein the gamma curve calculation circuitry is further configured to calculate the portion of the output gamma curve using a binary search and Bezier calculation method.

* * * * *